US012779658B2

(12) United States Patent
Su

(10) Patent No.: US 12,779,658 B2
(45) Date of Patent: Nov. 3, 2026

(54) FOLDABLE HAND TOOL

(71) Applicant: Hong Ann Tool Industries Co., Ltd., Taichung City (TW)

(72) Inventor: Cheng-Wei Su, Taichung City (TW)

(73) Assignee: HONG ANN TOOL INDUSTRIES CO., LTD., Taichung City (TW)

( * ) Notice: Subject to any disclaimer, the term of this patent is extended or adjusted under 35 U.S.C. 154(b) by 0 days.

(21) Appl. No.: 19/215,934

(22) Filed: May 22, 2025

(65) Prior Publication Data

US 2025/0282042 A1 Sep. 11, 2025

Related U.S. Application Data

(63) Continuation-in-part of application No. 18/079,349, filed on Dec. 12, 2022, now Pat. No. 12,343,856.

(30) Foreign Application Priority Data

Feb. 16, 2022 (TW) ................................ 111105668

(51) Int. Cl.
*B25G 1/06* (2006.01)
*B25G 1/04* (2006.01)
*B66F 15/00* (2006.01)

(52) U.S. Cl.
CPC ................ *B25G 1/06* (2013.01); *B25G 1/04* (2013.01); *B66F 15/00* (2013.01)

(58) Field of Classification Search
CPC ...... Y10T 29/53835; B66F 15/00; B25G 1/06
See application file for complete search history.

(56) References Cited

U.S. PATENT DOCUMENTS

| | | | |
|---|---|---|---|
| D244,252 | S | 5/1977 | Ardis |
| 4,646,378 | A | 3/1987 | Borden |
| 4,741,060 | A | 5/1988 | Hose |
| D337,492 | S | 7/1993 | Ryan et al. |
| 5,943,925 | A | 8/1999 | Huang |
| 6,308,355 | B1 | 10/2001 | McMillan et al. |
| 8,448,545 | B1 | 5/2013 | Argyle |
| 8,550,437 | B2 | 10/2013 | Liou |
| 8,695,463 | B2 | 4/2014 | Su |
| 10,058,720 | B2 | 8/2018 | Weinmeister |
| 11,260,507 | B2 | 3/2022 | Su |

(Continued)

FOREIGN PATENT DOCUMENTS

| | | |
|---|---|---|
| CN | 201529954 U | 7/2010 |
| CN | 204505105 U | 7/2015 |

(Continued)

*Primary Examiner* — Jason L Vaughan
(74) *Attorney, Agent, or Firm* — MUNCY, GEISSLER, OLDS & LOWE, P.C.

(57) ABSTRACT

A foldable tool includes a first rod member, a second rod member, a first pivoting device, a working member, and a second pivoting device. The first pivoting device is arranged between the first rod member and the second rod member, such that the first rod member and the second rod member are configured to be selectively pivotable to each other via the first pivoting device. The second pivoting device is arranged between the second rod member and the working member, such that the second rod member and the working member are configured to be selectively pivotable to each other via the second pivoting device.

11 Claims, 5 Drawing Sheets

(56) References Cited

U.S. PATENT DOCUMENTS

| | | | |
|---|---|---|---|
| 11,667,028 | B2 | 6/2023 | Su |
| 2002/0108473 | A1 | 8/2002 | Warner |
| 2009/0265872 | A1 | 10/2009 | Eldessouky |
| 2017/0021476 | A1 * | 1/2017 | Carnesi ................. B25B 13/481 |
| 2017/0259423 | A1 | 9/2017 | Yu |

FOREIGN PATENT DOCUMENTS

| | | | |
|---|---|---|---|
| CN | 208323190 | U | 1/2019 |
| CN | 213319848 | U | 6/2021 |
| TW | 416363 | U | 12/2000 |
| TW | 453255 | U | 9/2001 |
| TW | 475501 | U | 2/2002 |
| TW | M537001 | U | 2/2017 |
| TW | I727611 | B | 5/2021 |
| TW | M618322 | U | 10/2021 |

* cited by examiner

FOLDABLE HAND TOOL

CROSS-REFERENCE TO RELATED APPLICATIONS

The present application is a continuation-in-part of U.S. patent application Ser. No. 18/079,349, filed on Dec. 12, 2022, now pending, which claims the benefit of priority to Taiwan Patent Application No. 111105668, filed on Feb. 16, 2022, now issued as Taiwan Patent No. 1789244, the entire disclosure of which is incorporated herein by reference in its entirety for all purposes.

BACKGROUND OF THE INVENTION

The present invention relates to a hand tool and, more particular, to a foldable hand tool.

Hand tools utilizing the principle of leverage, such as a crowbar or a nail puller, are commonly used to pry fixed objects or support heavy objects for laborsaving. Therefore, for the purpose of laborsaving, such hand tools usually have a longer handle to provide a longer force arm. However, a longer handle will result in an increase in the overall length of the hand tool, which is not conducive to storage or transportation.

Thus, a need exists for a hand tool to mitigate and/or obviate the above disadvantages.

SUMMARY OF THE INVENTION

An objective of the present invention is to provide a foldable tool, which includes a first rod member, a second rod member, a first pivoting device, a working member, and a second pivoting device. The first pivoting device is arranged between the first rod member and the second rod member. The first rod member and the second rod member are configured to be selectively pivotable to each other via the first pivoting device. The second pivoting device is arranged between the second rod member and the working member. The second rod member and the working member are configured to be selectively pivotable to each other via the second pivoting device. The second pivoting device includes a third pivoting member and a fourth pivoting member pivotally coupled to the third pivoting member. The third pivoting member is arranged on the second rod member, and the fourth pivoting member is arranged on the working member.

In some embodiments, the third pivoting member is integrally formed with the second rod member, and the fourth pivoting member is integrally formed with the working member.

In some embodiments, the first rod member defines a first length, the second rod member defines a second length, and a ratio of the first length to the second length is in a range between 1.1 and 6.

In some embodiments, the ratio of the first length to the second length is in a range between 1.9 and 3.

In some embodiments, the ratio of the first length to the second length is in a range between 3 and 4.

In some embodiments, the ratio of the first length to the second length is in a range between 4 and 6.

In some embodiments, the working member is a gooseneck crowbar head, a 90 degree angled crowbar head, or an oblique crowbar head.

In some embodiments, the first rod member and the second rod member are respectively hollow.

In some embodiments, the first rod member is provided with a cover member mounted at a distal end thereof and a slip-proof portion formed on an outer periphery thereof and adjacent to the cover member.

In some embodiments, the first pivoting device includes a first pivoting member and a second pivoting member pivotally coupled to the first pivoting member. The first pivoting member is integrally formed with the first rod member, and the second pivoting member is integrally formed with the second rod member.

The present invention will become clearer in light of the following detailed description of illustrative embodiments of this invention described in connection with the drawings.

DETAILED DESCRIPTION OF THE INVENTION

Figure 1:
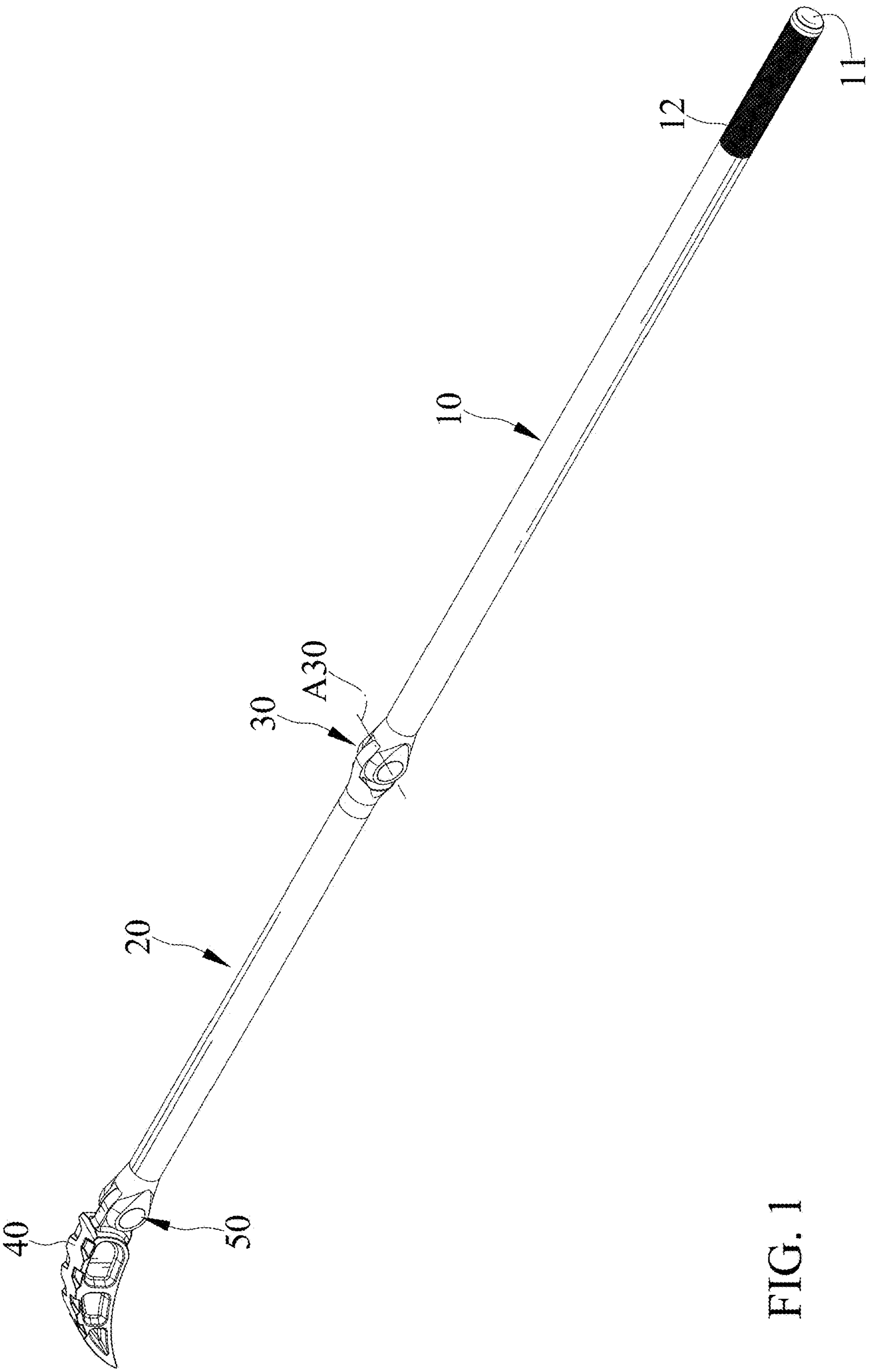
FIG. 1 is a perspective view of a foldable hand tool of a first embodiment according to the present invention.
Figure 2:
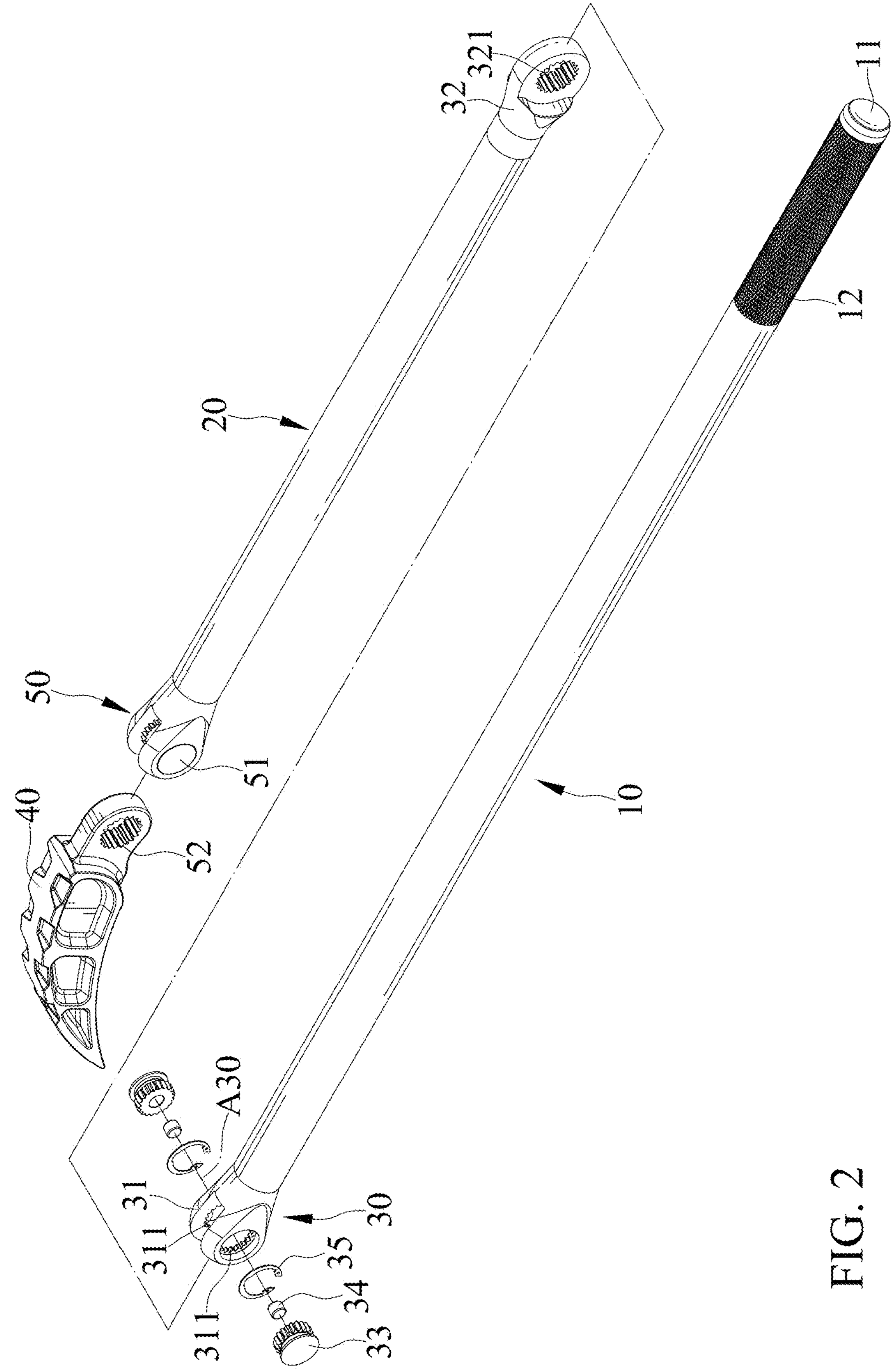
FIG. 2 is an exploded perspective view of the foldable hand tool of FIG. 1.
Figure 3:
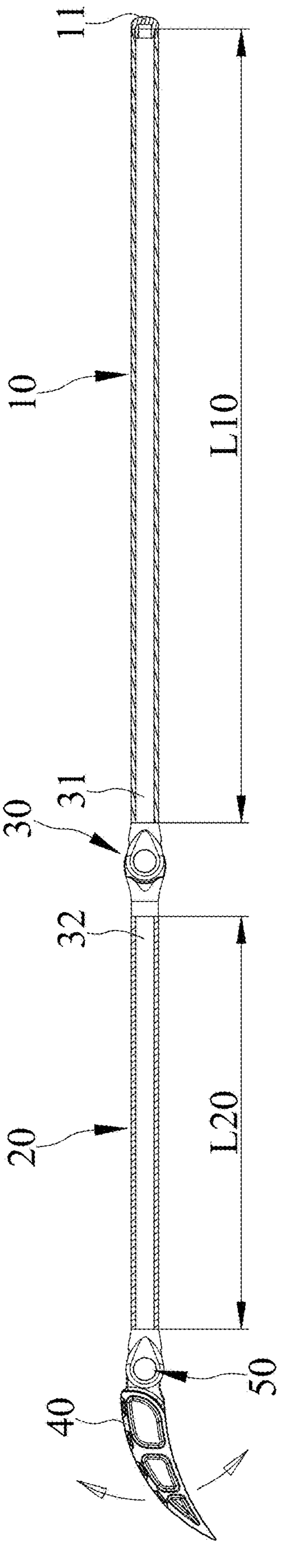
FIG. 3 is a cross sectional view of the foldable hand tool of FIG. 1.

FIGS. 1-3 show a foldable hand tool of a first embodiment according to the present invention. The foldable hand tool includes a first rod member 10, a second rod member 20, a first pivoting device 30, a working member 40, and a second pivoting device 50.

The first rod member 10 is hollow and provided with a cover member 11 mounted at a distal end thereof and a slip-proof portion 12 formed on an outer periphery thereof and adjacent to the cover member 11. The first rod member 10 defines a first length L10 in a longitudinal direction.

The second rod member 20 is hollow, and defines a second length L20 in a longitudinal direction. A ratio of the first length L10 to the second length L20 is in a range between 1.1 and 6. In the embodiment, the ratio of the first length L10 to the second length L20 is in a range between 1.9 and 3.

The first pivoting device 30 is arranged between the first rod member 10 and the second rod member 20, such that the first rod member 10 and the second rod member 20 are configured to be selectively pivotable to each other via the first pivoting device 30. The first pivoting device 30 includes a first pivoting member 31 and a second pivoting member 32 pivotally coupled to the first pivoting member 31. In the embodiment, the first pivoting member 31 may be integrally formed with the first rod member 10, and the second pivoting member 32 may be integrally formed with the second rod member 20.

As shown in FIG. 2, in the present embodiment, the first pivoting member 31 and the second pivoting member 32 are pivotally coupled about a pivoting axis A30. The first pivoting member 31 is provided with a pair of lugs, each formed with a first engaging hole 311. The second pivoting member 32 is provided with a lug disposed between the pair of lugs of the first pivoting member 31 and formed with a second engaging hole 321. The second engaging hole 321 is positioned to align with the pair of first engaging holes 311.

The first pivoting device 30 further includes a pair of pressable caps 33 respectively disposed outside the pair of first engaging holes 311. Each pressable cap 33 is provided with a magnet 34. The pair of magnets 34 are arranged with opposite polarities, thereby generating a mutual repulsive force between the magnets 34. This configuration causes the pair of pressable caps 33 to be normally biased outward and engaged with both the first engaging holes 311 and the second engaging hole 321 to achieve positioning and locking functionality.

Each pressable cap 33 is further secured in position by a fastener 35, which prevents the pressable cap 33 from disengaging from the outer periphery of the first engaging hole 311. When a user desires to adjust the angle between the first rod member 10 and the second rod member 20, the user may press the pressable caps 33 to overcome the magnetic repulsion, thereby disengaging the pressable caps 33 from the first and second engaging holes 311, 321. Once disengaged, the first rod member 10 and the second rod member 20 can be rotated relative to each other for folding or unfolding.

The working member 40 of the embodiment may be a gooseneck crowbar head.

The second pivoting device 50 is arranged between the second rod member 20 and the working member 40, such that the second rod member 20 and the working member 40 are configured to be selectively pivotable to each other via the second pivoting device 50. The second pivoting device 50 includes a third pivoting member 51 and a fourth pivoting member 52 pivotally coupled to the third pivoting member 51. The third pivoting member 51 is arranged on the second rod member 20, and the fourth pivoting member 52 is arranged on the working member 40. In the embodiment, the third pivoting member 51 may be integrally formed with the second rod member 20, and the fourth pivoting member 52 may be integrally formed with the working member 40. In the embodiment, the second pivoting device 50 may also have a similar structure as the first pivoting device 30.

Figure 4:
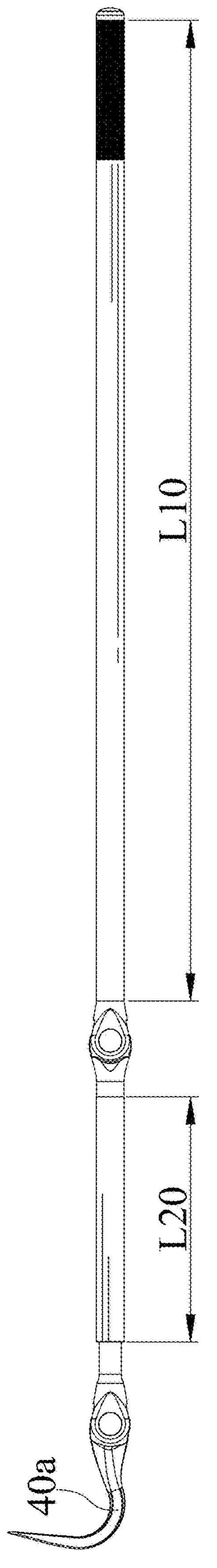
FIG. 4 is a side view of a foldable hand tool of a second embodiment according to the present invention.

FIG. 4 shows a foldable hand tool of a second embodiment according to the present invention. The second embodiment is substantially the same as the first embodiment. The main differences are that the ratio of the first length L10 to the second length L20 is in a range between 3 and 4, and the working member 40*a* is a 90 degree angled crowbar head.

Figure 5:
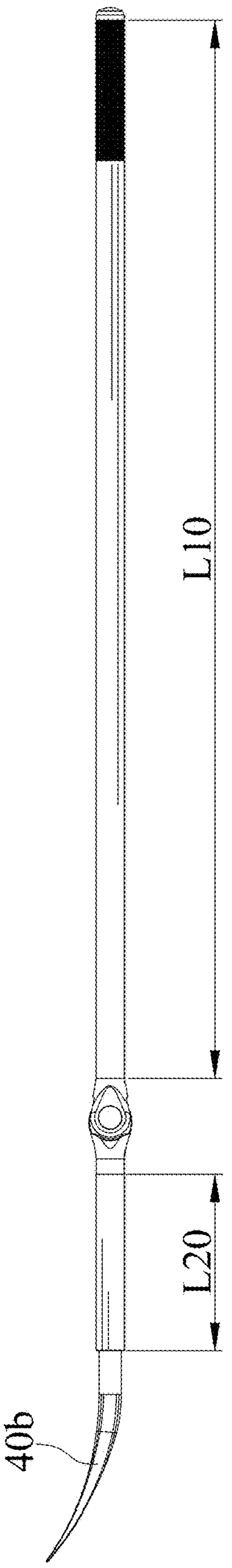
FIG. 5 is a side view of a foldable hand tool of a third embodiment according to the present invention.

FIG. 5 shows a foldable hand tool of a third embodiment according to the present invention. The third embodiment is substantially the same as the first embodiment. The main differences are that the ratio of the first length L10 to the second length L20 is in a range between 4 and 6, and the working member 40*b* is an oblique crowbar head.

Although specific embodiments have been illustrated and described, numerous modifications and variations are still possible without departing from the scope of the invention. The scope of the invention is limited by the accompanying claims.

The invention claimed is:

1. A foldable hand tool comprising:

a first rod member;

a second rod member;

a first pivoting device arranged between the first rod member and the second rod member, and wherein the first rod member and the second rod member are configured to be selectively pivotable to each other via the first pivoting device;

a working member; and a second pivoting device arranged between the second rod member and the working member, wherein the second rod member and the working member are configured to be selectively pivotable to each other via the second pivoting device, wherein the second pivoting device includes a third pivoting member and a fourth pivoting member pivotally coupled to the third pivoting member, wherein the third pivoting member is arranged on the second rod member, and wherein the fourth pivoting member is arranged on the working member, wherein the first pivoting device includes:

a first pivoting member provided with at least one lug formed with a first engaging hole;

a second pivoting member provided with a lug disposed adjacent to the at least one lug of the first pivoting member and formed with a second engaging hole, wherein the second engaging hole is aligned with the first engaging hole;

at least one pressable cap disposed outside the first engaging hole; and at least one fastener configured to prevent the at least one pressable cap from disengaging from the outer periphery of the first engaging hole.

2. The foldable hand tool as claimed in claim 1, wherein the third pivoting member is integrally formed with the second rod member, and wherein the fourth pivoting member is integrally formed with the working member.

3. The foldable hand tool as claimed in claim 1, wherein the first rod member defines a first length, wherein the second rod member defines a second length, and wherein a ratio of the first length to the second length is in a range between 1.1 and 6.

4. The foldable hand tool as claimed in claim 1, wherein the ratio of the first length to the second length is in a range between 1.9 and 3.

5. The foldable hand tool as claimed in claim 1, wherein the ratio of the first length to the second length is in a range between 3 and 4.

6. The foldable hand tool as claimed in claim 5, wherein the working member is a gooseneck crowbar head, a 90 degree angled crowbar head, or an oblique crowbar head.

7. The foldable hand tool as claimed in claim 1, wherein the ratio of the first length to the second length is in a range between 4 and 6.

8. The foldable hand tool as claimed in claim 1, wherein the first rod member and the second rod member are respectively hollow.

9. The foldable hand tool as claimed in claim 1, wherein the first rod member is provided with a cover member mounted at a distal end thereof and a slip-proof portion formed on an outer periphery thereof and adjacent to the cover member.

10. The foldable hand tool as claimed in claim 1, wherein the first pivoting device includes a first pivoting member and a second pivoting member pivotally coupled to the first pivoting member, wherein the first pivoting member is integrally formed with the first rod member, and wherein the second pivoting member is integrally formed with the second rod member.

11. The foldable hand tool as claimed in claim 1, wherein the at least one lug of the first pivoting member includes a pair of lugs, each formed with a first engaging hole;

wherein the lug of the second pivoting member is disposed between the pair of lugs of the first pivoting member, wherein the at least one pressable cap includes a pair of pressable caps respectively disposed outside the pair of first engaging holes, wherein each of the pressable caps is provided with a magnet, wherein the pair of magnets are arranged with opposite polarities to generate a mutual repulsive force therebetween, such that the pair of pressable caps are normally biased outward and engaged with both the first engaging holes and the second engaging hole, and wherein the at least one fastener includes a pair of fasteners configured to prevent the pair of pressable caps from disengaging from the outer peripheries of the first engaging holes.

* * * * *